United States Patent
Dasgupta

(10) Patent No.: US 8,516,521 B2
(45) Date of Patent: Aug. 20, 2013

(54) INTERACTIVE LEARNING

(75) Inventor: Mousumi Dasgupta, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 697 days.

(21) Appl. No.: 12/013,871

(22) Filed: Jan. 14, 2008

(65) Prior Publication Data

US 2009/0183201 A1 Jul. 16, 2009

(51) Int. Cl.
*G06F 3/00* (2006.01)
*G06F 13/00* (2006.01)
*H04N 5/445* (2011.01)
*G09B 25/00* (2006.01)

(52) U.S. Cl.
USPC ............ 725/39; 725/46; 725/47; 725/51; 725/120; 434/365; 434/428

(58) Field of Classification Search
USPC .......... 434/350, 352, 347, 349, 462, 365, 434/428; 725/25–28, 38, 39, 40, 44, 45, 725/46, 47, 51, 52, 56, 57, 61, 86–87
See application file for complete search history.

(56) References Cited

U.S. PATENT DOCUMENTS

| | | | | |
|---|---|---|---|---|
| 6,006,257 | A * | 12/1999 | Slezak | 725/110 |
| 6,684,399 | B1 * | 1/2004 | Grooters | 725/48 |
| 6,745,223 | B1 * | 6/2004 | Nobakht et al. | 709/200 |
| 6,787,722 | B2 * | 9/2004 | Tsutsui | 200/512 |
| 6,822,661 | B2 * | 11/2004 | Sai et al. | 715/716 |
| 7,496,945 | B2 * | 2/2009 | Rodriguez | 725/51 |
| 2003/0093548 | A1 * | 5/2003 | Cinghita et al. | 709/231 |
| 2003/0134261 | A1 * | 7/2003 | Jennen et al. | 434/354 |
| 2005/0005308 | A1 * | 1/2005 | Logan et al. | 725/135 |
| 2005/0097601 | A1 * | 5/2005 | Danker et al. | 725/39 |
| 2005/0177846 | A1 * | 8/2005 | Maruyama et al. | 725/35 |
| 2007/0037131 | A1 * | 2/2007 | Anderson | 434/323 |

OTHER PUBLICATIONS

Co-pending new U.S. Appl. No. 12/013,793, filed Jan. 14, 2008, entitled "Interactive Learning".
Co-pending new U.S. Appl. No. 12/013,849, filed Jan. 14, 2008, entitled "Interactive Learning".
Co-pending new U.S. Appl. No. 12/013,887, filed Jan. 14, 2008, entitled "Interactive Learning".
"Free Online Educational Materials Available to Parents and Caregivers to Keep Children Learning Throughout the Summer", Verizon News Release dated Jun. 18, 2007, 5 pages.
"It's Academic", Wikipedia: http://en.wikipedia.org/wiki/It%27s_Academic , Jan. 13, 2008, 5 pages.

* cited by examiner

*Primary Examiner* — Pankaj Kumar
*Assistant Examiner* — Alazar Tilahun

(57) ABSTRACT

A method may include providing a live, interactive program or information associated with the live, interactive program on a video display device; and providing a live interactive content icon on the video display device when a current time is before an end time of the live, interactive program, the live interactive content icon indicating that live interactive content is available for the live, interactive program.

18 Claims, 17 Drawing Sheets

| USER TABLE 300 | |
|---|---|
| USER NAME 302 | GROUP 304 |
| BRANDON LEE | STUDENT, POTOMAC HIGH, SOPHOMORE, CHEM2, MATH3, VARSITY SOCCER, QUIZ SHOW PARTICIPANT |
| JOHN LEE | PARENT, SOPHOMORE, POTOMAC HIGH, CHEM2, MATH3, VARSITY SOCCER, QUIZ SHOW OBSERVER |
| MARY JONES | TEACHER, CHEM2, MATH3, CHEM3, POTOMAC HIGH, LIVE QUIZ SHOW OBSERVER |

320 (Brandon Lee row), 328 (John Lee row), 330 (Mary Jones row)

FIG. 3

PROGRAM TABLE 400

| | PROGRAM NAME 402 | PREREQUISITE 406 | START 410 | END 412 | CHANNEL 414 | TAG 416 |
|---|---|---|---|---|---|---|
| 420 | The Today Show | NONE | 8:30am | 10:30am | 4 | HD, CC |
| 422 | Chemistry 2 | NONE | 9am | 9:30am | 5 | LIL, PH, CS |
| 424 | Math 3 | USER=MATH3 STUDENT, MATH3 PARENT, TEACH. | 9:30am | 10:30am | 5 | LIL, PH, CS |
| 426 | College Basketball | NONE | 9am | 11am | 7 | CC, HD |
| 428 | Local News | NONE | 9am | 11am | 8 | HD, CC |
| 430 | Spanish 4 Quiz Show | SPANISH AVG>90 | 9am | 9:30am | 9 | LIL, QS |
| 432 | Math 4 | NONE | 10am | 11am | 5 | LIL, CS |
| 434 | German 2 | NONE | 9:30am | 10:30am | 9 | LIL, CS |
| 436 | Spanish 1 Quiz Show | NONE | 10am | 10:30am | 9 | LIL, HD, QS |
| 438 | Biology 3 | NONE | 9:30 | 10:30am | 17 | LIL, CS |
| 440 | Econ Quiz Show | NONE | 9:30 | 10:30am | 53 | LIL, QS |
| 442 | Economics 3 | NONE | 10am | 10:30am | 53 | LIL, HD, CS |
| 444 | English 2 | NONE | 9:30am | 10:30am | 87 | LIL, CS |

FIG. 4

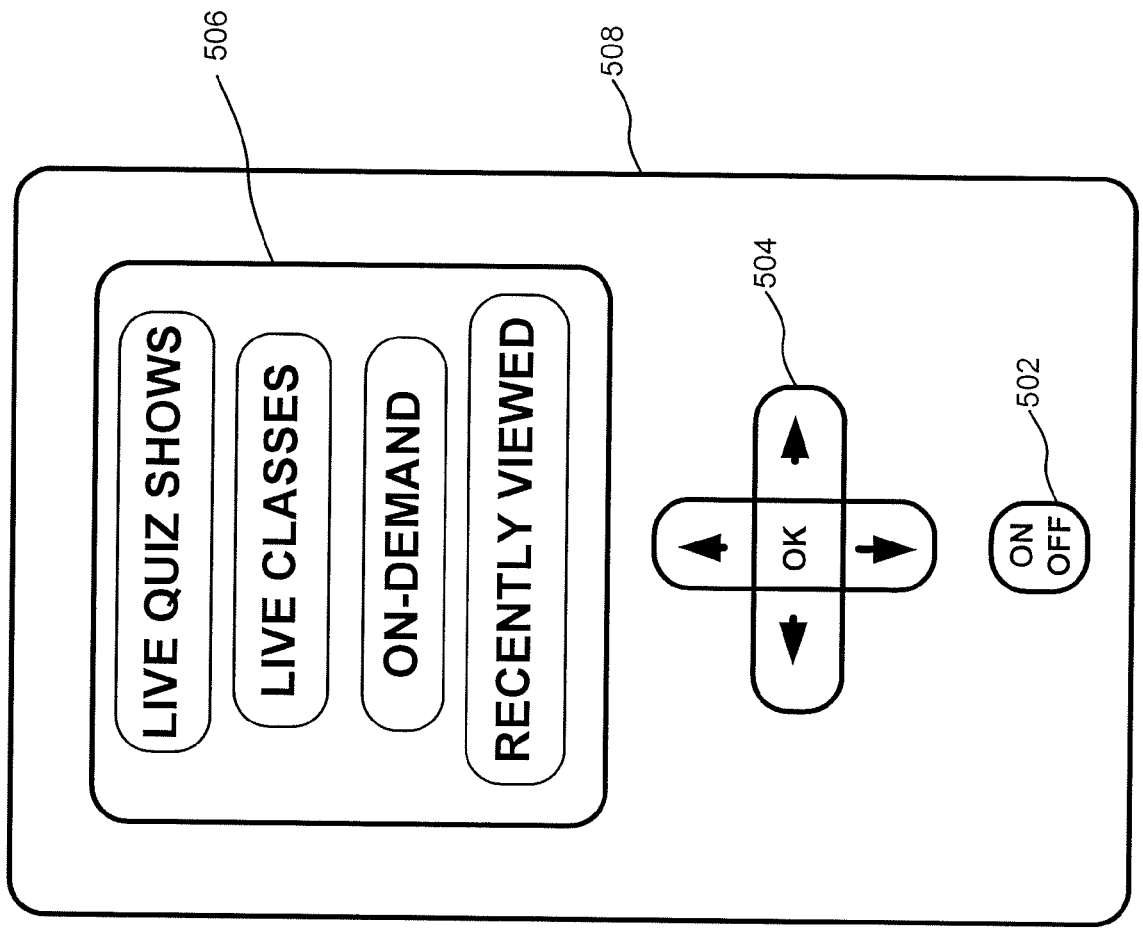

SHOW ONLY: | HD | LIVE INTERACTIVE LEARNING | CC | FiOS

750

| | 9:30am | NOW | 10am | | 10:30am |
|---|---|---|---|---|---|
| 5 | Math 3 (LIL) | | | Math 4 (LIL) | |
| 9 | German 2 (LIL) | | | Spanish 1 Quiz Show (LIL) HD | |
| 17 | Biology 3 (LIL) | | | | |
| 53 | Econ Quiz Show (LIL) | | | Economics 3 (LIL) HD | |
| 87 | English 2 (LIL) | | | | |

CHANNEL
5

TITLE
Chemistry 3

DESCRIPTION
Mary Jones of Potomac High teaches Math 3

TIME
9:30 to 10:30am

TAGS
Educational Class (CS),
Live Interactive Learning (LIL),
Potomac High School (PH)

PREREQUISITES
You must be a student of Potomac High
or a parent of a student of Potomac High to view this class.

INTERACTIVE LEARNING

BACKGROUND INFORMATION

On average, students in the United States spend four hours each day watching television. Even if students were to watch educational television during this time, which they probably would not, the students would still be passively watching—not the ideal educational setting.

BRIEF DESCRIPTION OF THE DRAWINGS

FIG. 3 is a block diagram of an exemplary user table;

FIG. 4 is a block diagram of an exemplary program table;

FIG. 5 is a diagram of an exemplary remote control;

FIG. 8 is a diagram of another exemplary display of a program guide;

FIG. 10 is a diagram of an exemplary information dialog for presenting particulars of a program;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Interactive learning may be a better learning environment for students when compared to passive television viewing or other non-learning activities. Embodiments described herein may provide a live, interactive learning (LIL) program icon on a screen of a video display device. The LIL icon may inform a user of the availability of live, interactive learning content in connection with a program. Live, interactive learning programs may include, for example, quiz shows in which students may participate or a live classroom in which students may participate.

Figure 1:
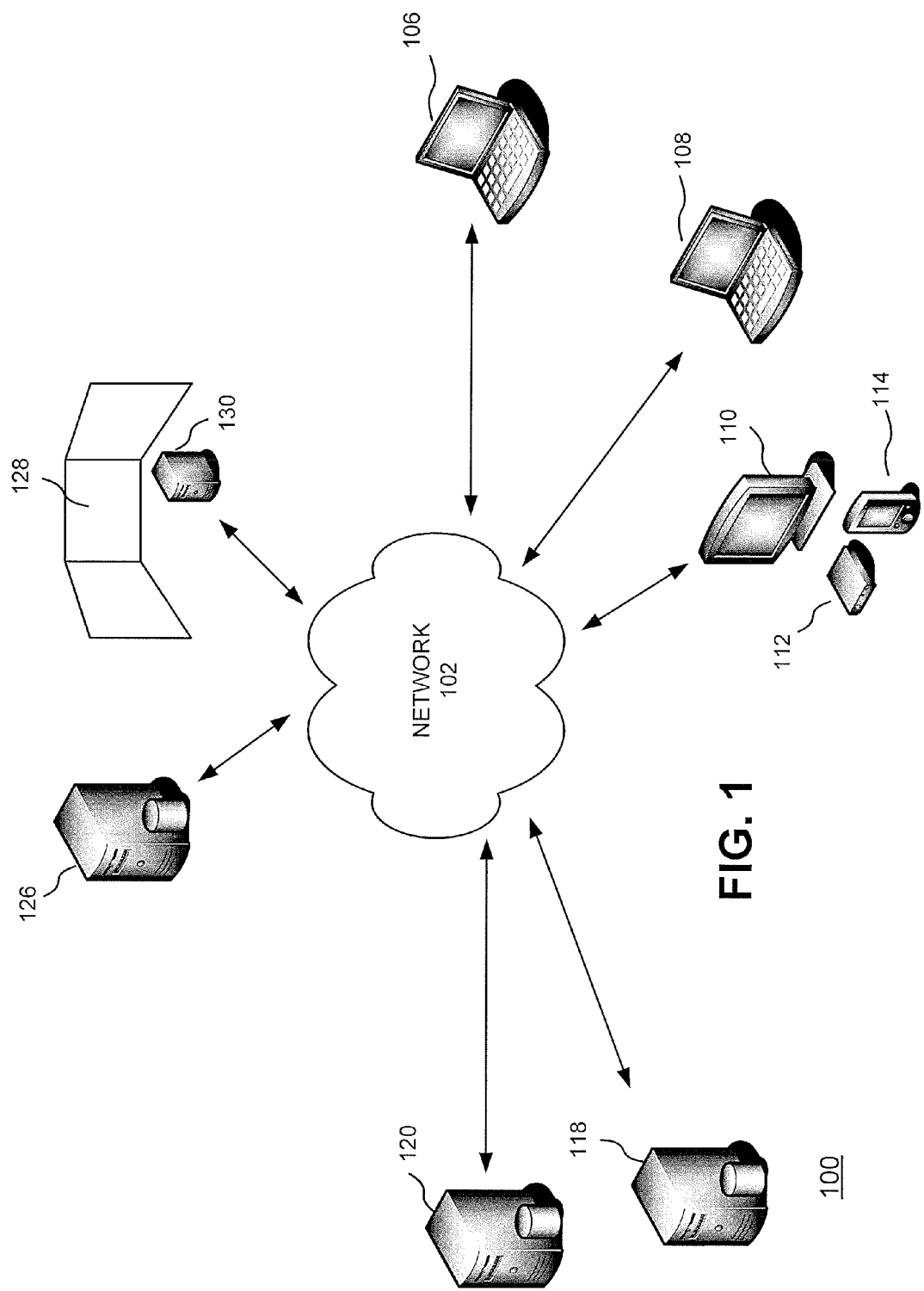
FIG. 1 shows an exemplary environment in which embodiments described herein may be implemented.

FIG. 1 shows an exemplary interactive educational environment 100 (environment 100 or interactive environment 100) in which embodiments described herein may be implemented. As shown, environment 100 may include a network 102 communicating with a group of devices. These devices may include, among other things, a student computer 106, a parent computer 108, a television 110 (TV 110), a set-top-box 112 (STB 112), a remote control 114 (remote 114), a quiz database 118, an application and web server 120, a materials database 126, a studio 128, and a studio server 130.

In other embodiments, environment 100 may include more, fewer, or different devices. For example, environment 100 may include printers for printing documents on paper. As another example, environment 100 may include more than one student computer, more than one parent computer, more than one studio, etc. Moreover, one or more devices 104-130 may perform one or more functions of any other device of personal network 100. Furthermore, one or more of devices 104-130 may be remotely located from each other. Although FIG. 1 shows devices 104-130 coupled to network 102, devices 104-130 may also be coupled with each other and/or may be able to communicate directly with each other. For example, parent computer 108 may be directly coupled to student computer 106, without traversing network 102.

Besides the devices shown in FIG. 1, devices coupled to network 102 may include any computational device, including among other things: a camcorder, a personal computer; a telephone, such as a radio telephone; a personal communications system (PCS) terminal that may combine a cellular radiotelephone with data processing, facsimile, and/or data communications capabilities; an electronic note pad; a personal music player (PMP); a personal digital assistant (PDA) that may provide Internet/intranet access, web browser, organizer, calendar, and a global positioning system (GPS).

Network 102 may include the Internet, an ad hoc network, a local area network (LAN), a wide area network (WAN), a metropolitan area network (MAN), a cellular network, a public switched telephone network (PSTN), or any other network or combinations of networks. Network 102 may include a high-speed fiber optic network, such as Verizon's FiOS™ network. A fiber-optic network may provide for a high-speed link from network 102 to devices coupled to network 102, e.g., STB 112, and a high-speed link from devices coupled to network 102, e.g., STB 112, to network 102. In one embodiment, the link from network 102 to devices coupled to network 102, e.g., STB 112, may be symmetric or near symmetric, allowing for data rates to be the same or near the same, e.g., high speed, from network 102 to devices coupled to network 102 and vice versa. Network 102 may include a video signaling and distribution network to distribute the information from a content delivery system.

Student computer 106 (computer 106) may include one or more computer systems for hosting programs, databases, and/or applications. Computer 106 may include a laptop or any computing device, e.g., a PDA, PMP, mobile phone, etc. Computer 106 may be used by a student in the student's home or in the student's classroom, for example. Computer 106 may include a media manager application program for storing, organizing, and playing digital media. The media manager may download digital media content from, for example, television broadcasts, the Internet, and/or a home network. Student computer 106 may include a browser application program for navigating the Internet and/or World-Wide Web (WWW). A student may use student computer 106 to receive assignments in any suitable formate, including PDF documents, word processing documents, video files, music files, text files, etc. A student may use computer 106 to communicate (via email or messaging) with other students, parents, and/or teachers. Computer 106 may be used to watch live classroom sessions. Computer 106 may be used to take quizzes, complete assignments, participate in online, participate remotely in classes, and/or interactive quiz shows.

Parent computer 108 (computer 108) may include one or more computer systems for hosting programs, databases, and/or applications. Computer 108 may include a laptop or any computing device, e.g., a PDA, PMP, mobile phone, etc. Using computer 108, the parent may also watch video, including recorded or live video from a studio (e.g., classroom). Using computer 108, the parent may also view video-on-demand (VOD) content or interactive content.

TV 110 may include a device capable of receiving and reproducing video and audio signals, e.g., a video display device. TV 110 may include a liquid crystal display (LCD), a cathode ray tube (CRT), a plasma display, etc. TV 110 may be associated with one or more speakers that output audio signals, such as stereo or mono audio. In another embodiment, TV 110 may include a computer monitor, a display of a stationary communication device (e.g., a telephone), or a portable communication device (e.g., a mobile telephone or a PDA), or the like. TV 110 may perform the same functions as student computer 106 and/or parent computer 108.

TV 110 may be associated with STB 112. STB 112 may include one or more computer systems for hosting programs, databases, and/or applications. STB 112 may receive communications from a cable and/or network service provider and may output video signals for display on TV 110. STB 112 may send communications to a cable and/or network service provider, e.g., requests for content for display. STB 112 may be used to order and receive VOD content from a content provider. In another embodiment, STB 112 may include a computer device, a cable card, a stationary communication device (e.g., a telephone), a portable communication device (e.g., a mobile telephone or a personal digital assistant (PDA)), or the like. STB 112 may perform decoding and/or decryption functions on information received from a content delivery system. STB 112 may include a video client.

TV 110 may be associated with remote 114. Remote 114 may include control keys to navigate menus displayed on TV 110, for example, and to otherwise control functions of TV 110 and/or STB 112. Remote control 114 may transmit infrared signals, or another type of signals, to a reader associated with STB 112 and/or TV 110.

Quiz database 118 may also store quiz questions and quizzes prepared by a teacher for an interactive quiz show. In another embodiment, quiz database 118 may also store assignments and quizzes prepared by a teacher for class. Quiz database 118 may also store previous recordings of quiz shows and previous recordings of classroom sessions.

Application and web server 120 (server 120) may include one or more computer systems for hosting programs, databases, and/or applications. Server 120 may run a web server application, such as Apache, to serve web pages when requested. Server 120 may serve pages including information from materials database 126 or quiz database 118.

Server 120 may allow for messaging between student, teachers, and/or parents. Messaging between students, teachers, and/or parents may include "white boarding," e.g., the interactive free-hand writing collaboration between students, teachers, and/or parents. Server 120 may allow for the viewing of live classes or quiz shows from studio 128, e.g., a classroom. Server 120 may allow for other forms of collaboration between students, teachers, and parents, including Voice over Internet Protocol (VOIP) or video conferencing, for example. Server 120 may automatically score quiz questions or quizzes taken by students during, for example, a quiz show. Server 120 may evaluate student performance, e.g., a student's scores, and may recommend an interactive study course to improve student performance. Server 120 may evaluate student performance and may recommend a quiz or quiz question for an interactive quiz show.

Materials database 126 may include a library of instructional resources. The instructional resources may be categorized and organized and may be searched by, for example, teachers, students, or parents. Videos across numerous topics may be stored in materials database 126 and may simplify difficult topics to increase learning retention. Materials database 126 may include previously recorded classes, previously recorded quiz shows, VOD, course profiles, projects, worksheets, quizzes, glossaries, encyclopedias, dictionaries, etc. The teacher may upload course profiles, assignments, and quizzes that the teacher created to materials database 126 for sharing with other teachers.

Studio 128 may include a recording studio (including one or more microphones and/or video cameras), a stage, an amphitheater, etc. Studio 128 may be located in a school or in the offices of a major broadcasting network, for example. Studio 128 may allow for conferences, plays, game shows, television shows, etc. Studio 128 may include a classroom that may allow a teacher to record or broadcast a classroom session. Studio 128 may include studio server 130 that may broadcast events taking place in studio 128.

Figure 2:
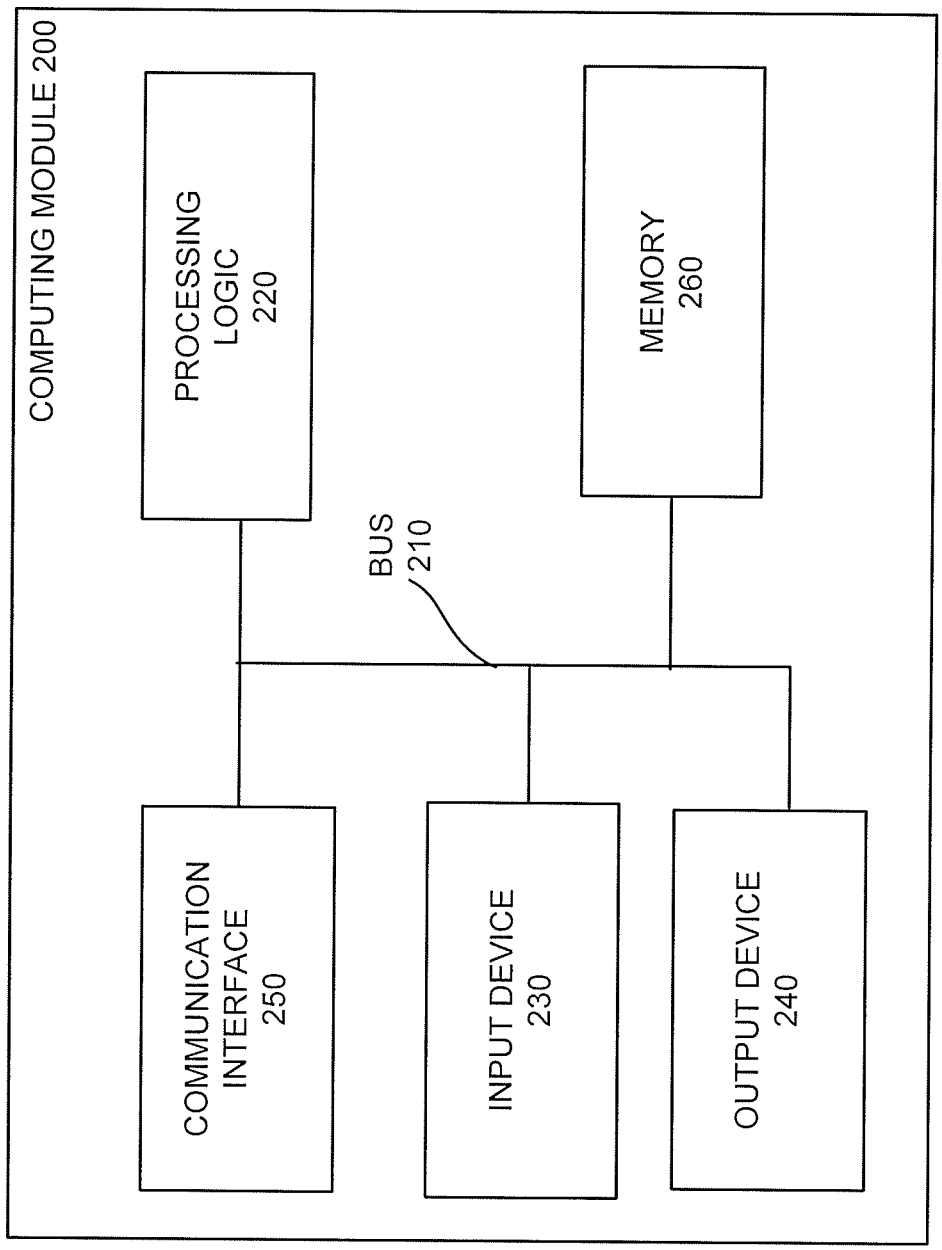
FIG. 2 is a block diagram of exemplary components of a computing module.

FIG. 2 is a block diagram of exemplary components of a computing module 200 (module 200). Any one of devices 104-130 may include one or more computing modules (e.g., a rack of computer modules), such as computing module 200. Module 200 may include a bus 210, processing logic 220, an input device 230, an output device 240, a communication interface 250, and a memory 260. Module 200 may include other components (not shown) that aid in receiving, transmitting, and/or processing data. Moreover, other configurations of components in device 200 are possible. Further, one or more components of module 200 may be remotely located.

Bus 210 may include a path that permits communication among the components of module 200. Processing logic 220 may include any type of processor or microprocessor (or groups of processors or microprocessors) that interprets and executes instructions. In other embodiments, processing logic 220 may include an application-specific integrated circuit (ASIC), a field-programmable gate array (FPGA), or the like.

Input device 230 may include a device that permits a user to input information into module 200, such as a keyboard, a keypad, a mouse, a pen, a microphone, a remote control, a touch-screen display, one or more biometric mechanisms, or the like. Output device 240 may include a device that outputs information to the user, such as a display, a printer, a speaker, etc. Output device 240 may include a vibrator to alert a user.

Input device 230 and output device 240 may allow the user of module 200 to receive or view a menu of options. The menu may allow the user to select various functions or services associated with applications executed by module 200 or other devices coupled to network 102. Input device 230 and output device 240 may allow the user to activate a particular service or application, such as a service defined by a device table described below.

Communication interface 250 may include any transceiver-like mechanism that enables module 200 to communicate with other devices and/or systems. Communication interface 250 may include a transmitter that may convert baseband signals from processing logic 220 to radio frequency (RF) signals and/or a receiver that may convert RF signals to baseband signals. Alternatively, communication interface 250 may include a transceiver to perform functions of both a transmitter and a receiver. Communication interface 250 may be coupled to an antenna for transmission and reception of the RF signals. Communications interface 250 may include a network interface card, e.g., Ethernet card, for wired communications or a wireless network interface (e.g., 802.11x (WiFi)) card for wireless communications. Communication interface 250 may also include, for example, a universal serial bus (USB) port for communications over a cable, a Bluetooth™ wireless interface for communicating with other Bluetooth™ devices, a near-field communication (NFC) device, etc. Communications interface 250 may receive, transmit and/or process digital or analog audio inputs/outputs and/or digital or analog video inputs/outputs.

Memory 260 may include a random access memory (RAM) or another type of dynamic storage device that may store information and instructions, e.g., an application, for execution by processing logic 220; a read-only memory (ROM) device or another type of static storage device that may store static information and instructions for use by processing logic 220; and/or some other type of magnetic or optical recording medium and its corresponding drive, e.g., a hard disk drive (HDD), for storing information and/or instructions.

Module 200 may perform certain operations, as described in detail below. Module 200 may perform these operations in response to processing logic 220 executing software instructions contained in a computer-readable medium, such as memory 260. A computer-readable medium may be defined as a physical or logical memory device. The software instructions may be read into memory 260 from another computer-readable medium or from another device via communication interface 250. The software instructions contained in memory 260 may cause processing logic 220 to perform processes that are described below.

FIG. 3 is a block diagram of an exemplary user table 300. User table 300, e.g., a database, may store a list of users (including institutional users) that are allowed to access interactive environment 100, such as databases 118 and/or 126, and application and web server 120, for example, and the groups associated with the corresponding user. User table 300 may be stored in memory 260 of any device coupled to network 102, such as database 118 and/or 126, or web server 120. User table 300 may include a user name field 302 and a group field 304. User table 300 may include additional, different, or fewer fields than illustrated in FIG. 3.

User name field 302 may include the name of a user or an institution that may have access to interactive environment 100. Students, teachers, parents, teams, and schools may each have a user name and a record in user table 300. In the exemplary user table 300, there are three users listed: BRANDON LEE, JOHN LEE, and MARY JONES. In other words, Brandon Lee, John Lee, and Mary Jones may be allowed some form of access to interactive environment 100.

Group field 304 may indicate the groups with which the corresponding user name in user name field 302 may be associated. In the exemplary user table 300, record 320 indicates the user name BRANDON LEE may be associated with the following groups as indicated in corresponding group field 304: STUDENT, POTOMAC HIGH, SOPHOMORE, CHEM2, MATH3, VARSITY SOCCER, and QUIZ SHOW PARTICIPANT. In other words, Brandon Lee may be a sophomore student at Potomac High who takes Chemistry 2 and Math 3 classes, is on the varsity soccer team, and may participate in quiz shows. Record 328 indicates that a user name JOHN LEE may be associated with the following groups: PARENT, SOPHMORE, POTOMAC HIGH, CHEM2, MATH3, VARSITY SOCCER, and QUIZ SHOW OBSERVER. In other words, John Lee may be a parent of a sophomore who attends Potomac High, takes Chemistry 2, Math 3, and is on the varsity soccer team. John Lee may also be able to observe quiz shows. Record 330 indicates that a user name MARY JONES may be associated with the following groups: TEACHER, CHEM2, CHEM3, POTOMAC HIGH, and QUIZ SHOW OBSERVER. In other words, Mary Jones may be a teacher involved with Chemistry 2, Chemistry 3, and Math 3 at Potomac High. Mary Jones may also be able to observe quiz shows.

FIG. 4 is a block diagram of an exemplary program table 400. Program table 400 may store program information regarding quiz shows, classes, etc. in interactive environment 100 that are currently ongoing or taking place (e.g., live), previously recorded (e.g., on-demand), and scheduled (e.g., future or planned). Future or planned programs may also be considered live in that when the future or planned program occurs, it will be live. Program table 400 may also store information regarding programs not related to interactive learning, such as news programs, situation comedies, etc. Program table 400 may be stored in memory 260 of quiz database 118, for example, or any device coupled to network 102. In another embodiment, program table 400 may be stored in memory 260 of materials database 126, for example.

Program table 400 may include a program name field 402, a prerequisite field 406, a start field 410, an end field 412, a channel field 414, and a tag field 416. These fields are exemplary and program table 400 may include additional, different, or fewer fields than illustrated in FIG. 4. Other fields may include a location field and a program type field, for example.

Program name field 402 may include the name of the program (e.g., a class or a quiz show). The name may be descriptive of the item, such as "Chemistry 2" as shown in record 422 of FIG. 4. Program names other than those shown in FIG. 4 are possible.

Prerequisite field 406 may include the prerequisites, e.g., conditions such as an achievement level, etc., for viewing or participating in the associated program. Prerequisite field 406 may include the groups of people allowed to watch or participate in the program. In other words, prerequisite field 406 may also indicate one or more groups for whom the corresponding program was intended. For example, the program associated with record 424 may only be taken or viewed by students in Math 3 class (e.g., USER=MATH3 STUDENT), parents who have a child in the Math 3 class (USER=MATH 3 PARENT), or teachers (USER=TEACHER). As shown in record 430, participation in SPANISH QUIZ SHOW may be limited to a students who have achieved a particular achievement level in a specific class (e.g., SPANISH AVERAGE>90). Other prerequisites not shown in FIG. 4 are possible.

Start field 410 may indicate the time of day, day of year, and/or year that the corresponding program started (if the start time is in the past) or is scheduled to start (if the start time is in the future). End field 412 may indicate the time of day, day of year, and/or year that the corresponding program ended (if the program ended in the past) or is scheduled to end (if the program will end in the future). Channel field 414 may indicate the television programming channel on which the program appeared (if in the past) or is scheduled to appear (if in the future).

Tag field 416 may include other information regarding the program associated with the record. Tags may include CLASS (CS), QUIZ SHOW (QS), ON DEMAND (OD), HIGH DEFINITION (HD), and CLOSED CAPTIONING (CC), for example. A tag in tag field 416 may indicate a location, such as POTOMAC HIGH (PH). A tag in tag field 416 may indicate that a program includes live, interactive learning content (LIL). LIL content may include content having interactions between two individuals participating in the program. LIL content may also be more simply referred to as live, interactive content. Tags other than those shown in FIG. 4 are possible. As shown in record 422, the program with the name "Chemistry 2" may include CS, PH, and LIL tags in tag field 416.

In another embodiment, program table 400 may take the form of an extensible-markup language (XML)-based data file, e.g., a meta-data file. For example, record 422 of FIG. 4 may be represented by the following XML data:

```
<Metadata>
  <Asset>
    <Title Value="Math 3" />
    <Description Value="Mary Jones of Potomac High teaches Math 3"/>
    <Tag Value="LIL, PH, CS" />
    <Start Value ="9:30"/>
    <End Value = "10:30"/>
    <User Value = "MATH 3 STUDENT, MATH 3 PARENT,
    TEACHER"/>
  </Asset>
</Metadata>
```

The XML data above may include more information than shown in program table 400, such as the description of the program (e.g., "Mary Jones of Potomac High teaches Math 3").

FIG. 5 is a diagram of an exemplary remote 114 of FIG. 1. Remote 114 may include an on/off button 502, control buttons 504, a display 506, and a housing 508. On/off button 502 may turn TV 110 on and off. Control buttons 504 may include left, right, up, down, and OK buttons. The user of remote 114 may interact with TV 110 to control TV 110. For example, remote control 114 may be used to navigate menus displayed on TV 110. Remote 114 may also be used to navigate menus displayed on display 506, such as navigating and selecting a LIVE QUIZ SHOWS button, a LIVE CLASSES button, an ON DEMAND button, and/or a RECENTLY VIEWED button. Remote control 114 may be used, for example, to input answers to quiz questions shown on TV 110 or display 506. Remote 114 may communicate with TV 110 via infra red (IR) or RF signals.

Figure 6:
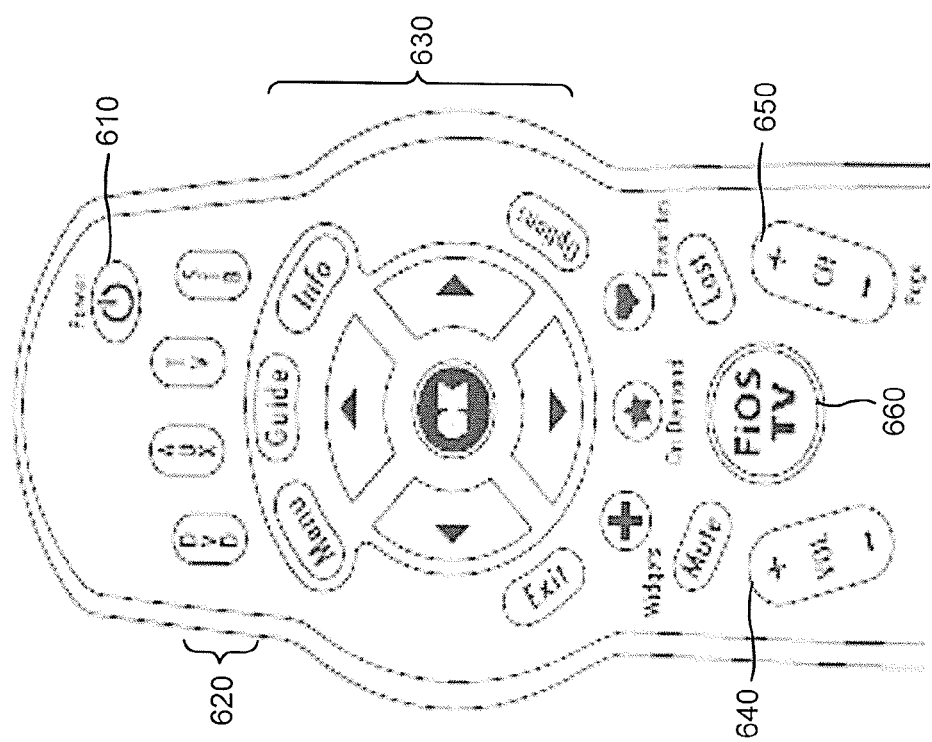
FIG. 6 is a diagram of another exemplary remote control.

FIG. 6 is an exemplary diagram of a portion of an alternative embodiment of remote 114. As shown in FIG. 6, remote 114 may include buttons 610-660 that may cause STB 112 or TV 110 to perform various functions. For example, remote 114 may include a power button 610, device selection buttons 620, program guide buttons 630, volume button 640, channel button 650, and an interactive content button 660.

Power button 610 may cause a controlled device (e.g., STB 112, TV 110, or another device, such as a receiver, a VCR, or a DVD player) to power up or down. Device selection buttons 620 may identify a device to be controlled, such as STB 112, TV 110, or another device, such as a receiver, a VCR, or a DVD player.

Program guide buttons 630 may include buttons for displaying and interacting with an on-screen program guide. The program guide may include information regarding available programs, such as program descriptions, program listings, program schedules, etc. Volume button 640 may cause a controlled device to change its volume setting. Channel button 650 may cause a controlled device to change its channel setting. Interactive content button 660 may cause interactive content to be provided in association with a program offering interactive content.

Figure 7:
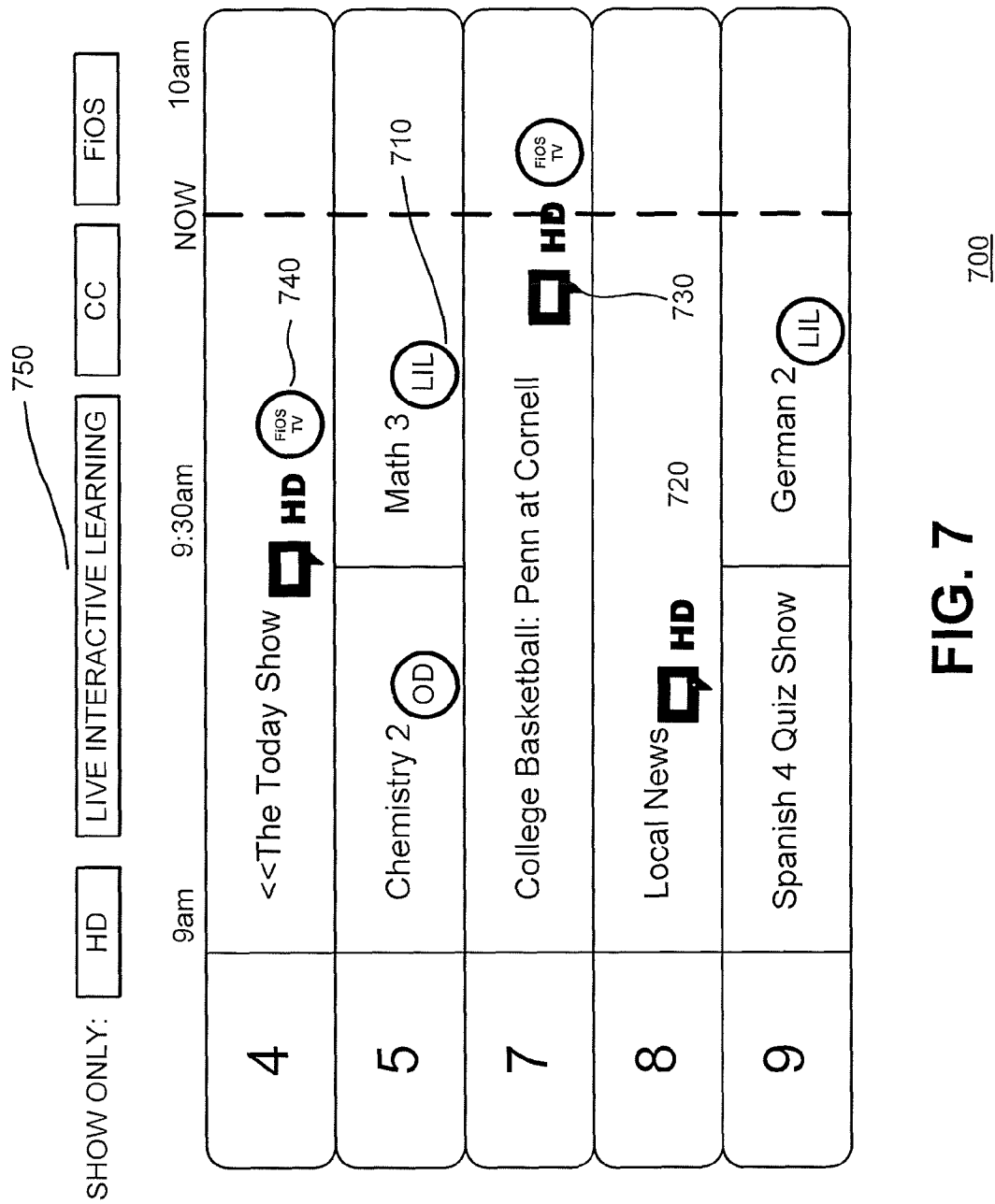
FIG. 7 is a diagram of an exemplary display of a program guide.

FIG. 7 is an exemplary display of a program guide 700. As shown in FIG. 7, a LIL icon 710 may be presented on program guide 700. Program guide 700 may include a listing and/or schedule of programs other than live, interactive learning programs. For example, program guide 700 may include a list of news and movie programs. Programs related to live interactive learning content, however, may include LIL icon 710. Other icons may also be displayed on program guide 700, such as an HD content icon 720, a CC content icon 730, and a FiOS TV content icon 740. The current time in program guide 700 may be represented by a dashed line with a "NOW" indicator.

Exemplary program guide 700 presents information regarding the programs listed in program table 400. In particular, program guide 700 presents information related to records 420 through 430 and 434. Note, that in program guide 700, the Chemistry 2 class and the Spanish 4 Quiz Show do not include LIL icons. In this embodiment, these two programs do not include LIL icons because the class and the quiz show have completed and may no longer be considered live and/or interactive. Instead, these programs may be considered on-demand, as they are recorded and may be stored in a database, such as materials database 126 for future viewing. In one embodiment, LIL tags in program table 400 may be changed to OD tags when a live program has concluded.

The LIL icon (or the tags associated with the LIL content icons) may be used to filter the programs listed in the program guide. For example, the program guide may offer a number of ways that the listed programs can be filtered. Examples of ways for filtering the programs listed in the program guide include filtering by programs having LIL icons or tags, programs having HD icons or tags, programs having CC icons or tags, programs having OD icons or tags, programs having FiOS icons or tags, etc. Programs may also be filtered based on information in prerequisite field 406 and/or groups field 304, for example, so that a user is only presented with programs he or she is authorized to see.

As shown in FIG. 7, program guide 700 may present programs that have already completed, such as Chemistry 2 between 9 am and 9:30 am. In one embodiment, the user may select Chemistry 2 and may view the previously recorded Chemistry 2 class as an on-demand program delivered via, e.g., STB 112 from materials database 126.

FIG. 8 is an exemplary program guide 800 of the filtering of programs offering LIL content. As shown in FIG. 8, the program guide may show only those programs for which LIL content is available. Filtering of programs by LIL content may be designated by shading or otherwise indicating LIL content button 750. Exemplary program guide 800 may show information regarding the programs listed in program table 400, for example, including records 432 and records 436 through 434. In one embodiment, LIL content may be filtered based on information in prerequisite field 406 and/or user field 302. In other words, in one embodiment, the user may only be presented with content he or she is qualified to view.

Figure 9:
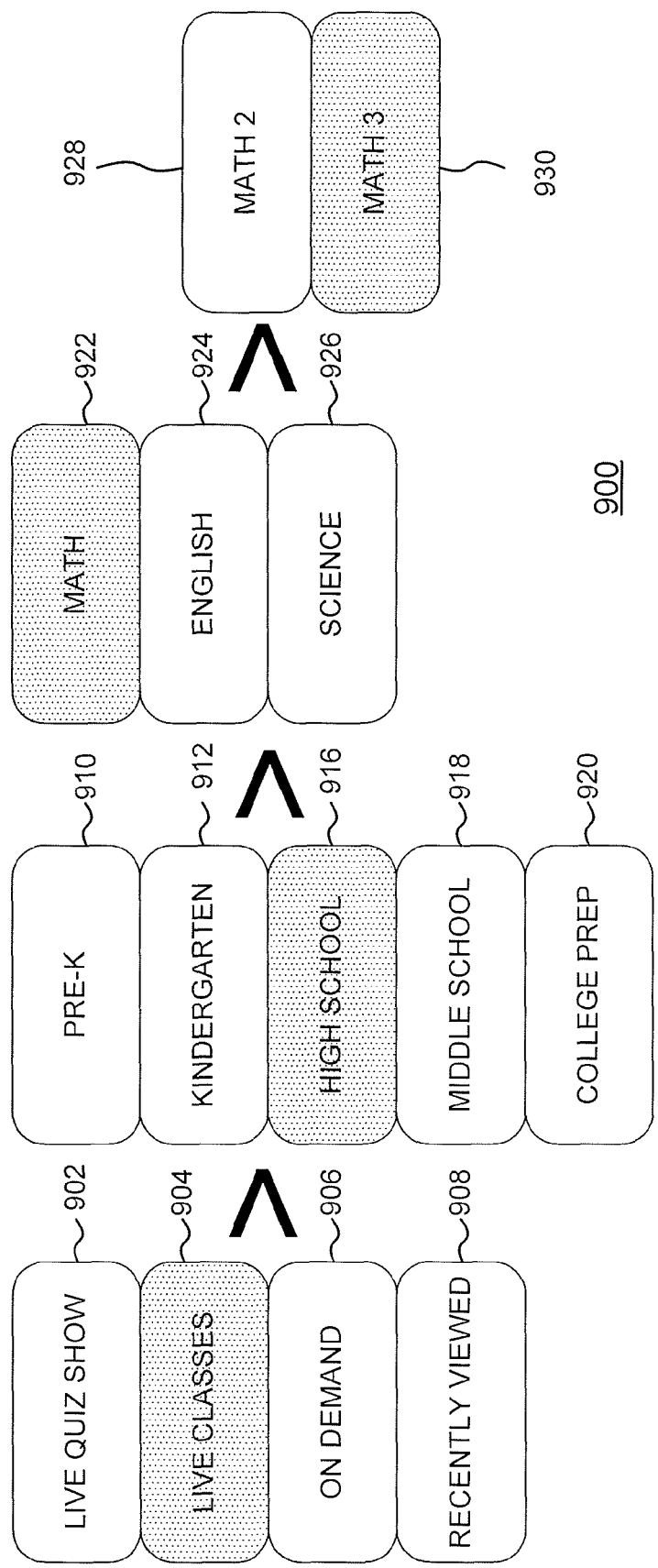
FIG. 9 is diagram of an exemplary graphical user interface (GUI) for searching for and filtering programs in a program guide.

FIG. 9 is a block diagram of another exemplary GUI 900 associated with selection of an interactive live class. GUI 900 may include four columns of buttons, e.g., four columns of menu options. The first column of menu options may include a LIVE QUIZ SHOW option 902, a LIVE CLASSES option 904, an ON DEMAND option 906, and a RECENTLY VIEWED option 908. In GUI 900, the LIVE CLASSES option 904 is highlighted and selected (as shown by the gray shading).

The second column of menu options may include a PRE-K option 910, a KINDERGARTEN option 912, HIGH SCHOOL option 916, a MIDDLE SCHOOL option 918, and a COLLEGE PREP option 920. This second column of menu options may include the menu options associated with selecting the LIVE CLASSES option 904 from the first column of menu options. In the exemplary display in FIG. 9, the HIGH SCHOOL option 916 may be highlighted and selected (as shown by the gray shading).

The third column of menu options may include a MATH option 922, an ENGLISH option 1924, and a SCIENCE option 926. The third column of menu options may include the menu options associated with selecting the HIGH SCHOOL option 916 in the second column. In exemplary GUI 900, the MATH option 922 is highlighted and selected (as shown by the gray shading).

The fourth column of menu options may include a MATH 2 option 928 and a MATH 3 option 930. In exemplary GUI 900, MATH 3 option 930 may be highlighted and selected (as shown by the gray shading). Upon selection of an option from the fourth column (e.g., MATH 3 option 930), the selected program may begin. In another embodiment, upon selection of an option from the fourth column (e.g., MATH3 option 930), the particulars of the program may be displayed. In another embodiment, upon selection of an option from the fourth column (e.g., MATH3 option 930), may allow for the scheduling of a recording of the program for future viewing.

FIG. 10 is a diagram of an exemplary information dialog 1000 for presenting the particulars of a selected program. For example, if the user selected MATH 3 option 930 in FIG. 9, the particulars shown in dialog 1000 may be displayed on TV 110, for example. As shown in FIG. 10, dialog 1000 indicates that a Math 3 class program is to take place on channel 5 between 9:30 and 10:30 am. Dialog 1000 also indicates that the program is an educational class (e.g., includes a CS tag) from Potomac High School (e.g., includes a PH tag) featuring live, interactive learning (e.g., includes a LIL tag). Dialog 1000 (or some of the information in dialog 1000) may appear in the program guide (such as programming guide 700), a program information page (e.g., a page that may envelop the entirety of TV 110's screen), or a program status bar (e.g., a dialog that is superimposed on the program).

Figure 11:
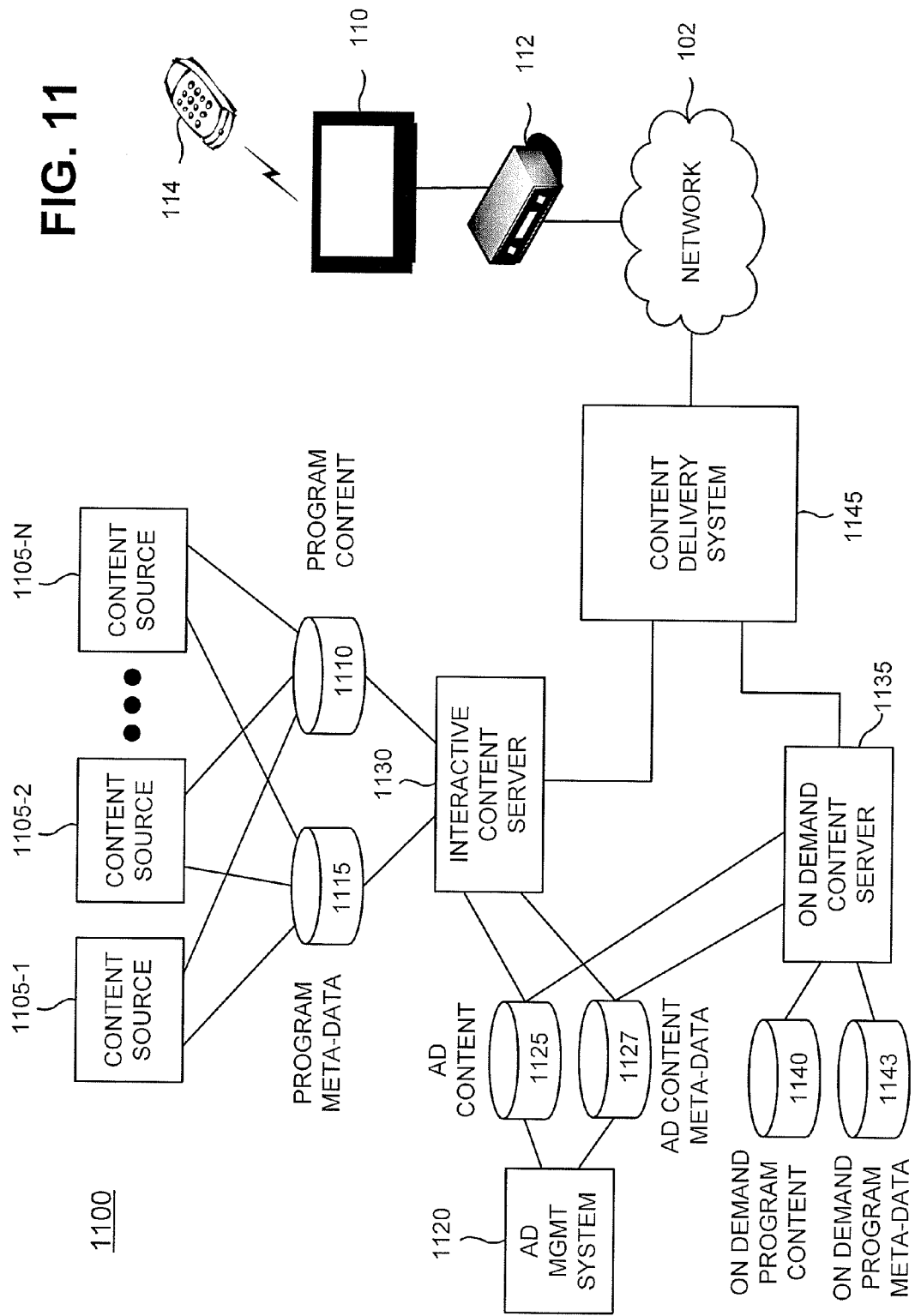
FIG. 11 is a block diagram of an alternative exemplary environment in which systems and methods described herein may be implemented.

FIG. 11 is a block diagram of an alternative exemplary environment 1100 in which systems and methods described herein may be implemented. Environment 1100 may include content sources 1105-1, 1105-2, . . . , 1105-N (where N>=1) (collectively referred to as "content sources 1105"), a program content database 1110, a program meta-data database 1115, an advertising (ad) management (mgmt) system 1120, an advertising content database 1125, an advertising content meta-data database 1127, an interactive content server 1130, an on-demand content server 1135, an on-demand content database 1140, an on-demand meta-data database 1143, and a content delivery system 1145. Environment 1100 may also include network 102, STB 112, TV 110, and remote control 114 as shown in FIG. 1. In practice, environment 1100 may include more, fewer, or different devices than are shown in FIG. 11. Also, two or more of these devices may be implemented within a single device, or a single device may be implemented as multiple, distributed devices. Further, while FIG. 11 shows direct connections between the various devices, any of these connections can be indirectly made via a network, such as a local area network, a wide area network (e.g., the Internet), a telephone network (e.g., the Public Switched Telephone Network (PSTN) or a cellular network), or a combination of networks.

Content sources 1105 may include any type or form of content, including interactive or non-interactive content. For example, content sources 1105 may include free television broadcasts (e.g., local broadcasts, such as NBC, CBS, ABC, and Fox), for-pay television broadcasts (e.g., TNT, ESPN, HBO, Cinemax, CNN, etc.), and/or web-based content (e.g., streaming content from web sites). Content sources 1105 may also include live, interactive learning content from environment 100. For example, content sources 1105 may include one or more studios and studio servers, such as studio 128 and studio server 130 of FIG. 1.

Program content database 1110 may store video signals representing the programs provided by various ones of content sources 1105. Program content database 1110 may store interactive or non-interactive content.

Program meta-data database 1115 may store meta-data associated with the programs provided by various ones of content sources 1105. Program meta-data database 1115 may store an association between content and advertisements with which the content corresponds. In one embodiment, program meta-data database 1115 may also store content icons and an association between the content icons and the programs and/or advertisements with which the content icons correspond. The meta-data might include program descriptions, program line-ups and/or schedules, or other information associated with the programs in program content database 1110. An example of meta-data may include information stored in program table 400 or in the XML-based data file described above.

Advertising management system 1120 may control advertising content presented in connection with the programs in program content database 1110 and/or on-demand content database 1140. Advertising management system 1120 may store advertising content in advertising content database 1125. The advertising content may include advertisements (e.g., commercials that are inserted within a program signal, long form advertisements that are not inserted within the program signal, text or graphics that are overlaid on a program or an advertisement, advertisements that are presented alongside the program signal, and/or interactive advertisements) and/or links to advertisements that may be served via a network, such as the Internet. Advertising content meta-data database 1127 may store meta-data associated with the advertisements in advertising content database 1125. Meta-data stored in database 1127 may include, for example, scheduling information, rating information, category information, length of advertisement, classification information, expiration date of the advertisement, or other information that advertising management system 1120 and/or content servers 1130 and/or 1135 may find useful in serving and/or targeting the advertising content.

Interactive content server 1130 may include a device that is capable of controlling the serving of programs from program content database 1110, the program meta-data from program meta-data database 1115, and/or the advertising content from advertising content database 1125. Interactive content server 1130 may also serve non-interactive content from non-interactive content sources. In one embodiment, content server 1130 may include a content mixing engine to select information, such as programs, program meta-data, advertising content, and/or advertisement meta-data, and mix the information together. Interactive content server 1130 may also perform transcoding of the mixed information. Interactive content server 1130 may include a device that is capable of managing the serving of interactive content, such as live, interactive learning content. Interactive content server 1130 may retrieve content, as necessary, from program content database 1110.

On-demand program database 1140 may store on demand content. For example, previously recorded live, interactive learning content may become on-demand content after a showing and may be stored in on-demand program content database 1140. In one embodiment, on-demand program database 1140 may include materials database 126 and/or quiz database 118.

On-demand meta-data database 1143 may store meta-data associated with the programs stored in on-demand program database 1140. On-demand program meta-data database 1143 may store an association between content and advertisements with which the content corresponds. In one embodiment, on-demand program meta-data database 1143 may also store content icons and an association between the content icons and the programs and/or advertisements with which the content icons correspond. The meta-data might include program descriptions, program line-ups and/or schedules, or other information associated with the programs in on-demand program content database 1140. An example of meta-data may include information stored in program table 400 or in the XML-based data file described above.

On-demand content server 1135 may retrieve on-demand content, as necessary, from on-demand content database 1140. On-demand content server 1135 may include a device that is capable of controlling the serving of programs from on-demand program content database 1140, meta-data from on-demand meta-data database 1143, meta-data from ad content meta-data database 1127, and/or advertising content from advertising content database 1125. In one embodiment, content server 1130 may include a content mixing engine to select information, such as programs, program meta-data, advertising content, and/or advertisement meta-data, and mix the information together. Content server 1135 may also perform transcoding of the mixed information.

Content delivery system 1145 may include a device that is capable of delivering information to a customer's equipment (e.g., STB 112, TV 110, etc.). Content delivery system 1145 may include a service adapter component and a media relay component. The service adapter component may control what information (e.g., what programs and/or advertisements) to provide to which customers based, for example, on customer subscriptions and/or profiles, groups, etc. (e.g., user table 300 and/or program table 400). The media relay component may control the transmission of the information to the customers. The media relay component may perform encoding and/or encryption functions. Content delivery system 1145 may also include one or more on demand components that may provide on demand services (e.g., music, video, and/or games on demand).

Figure 12:
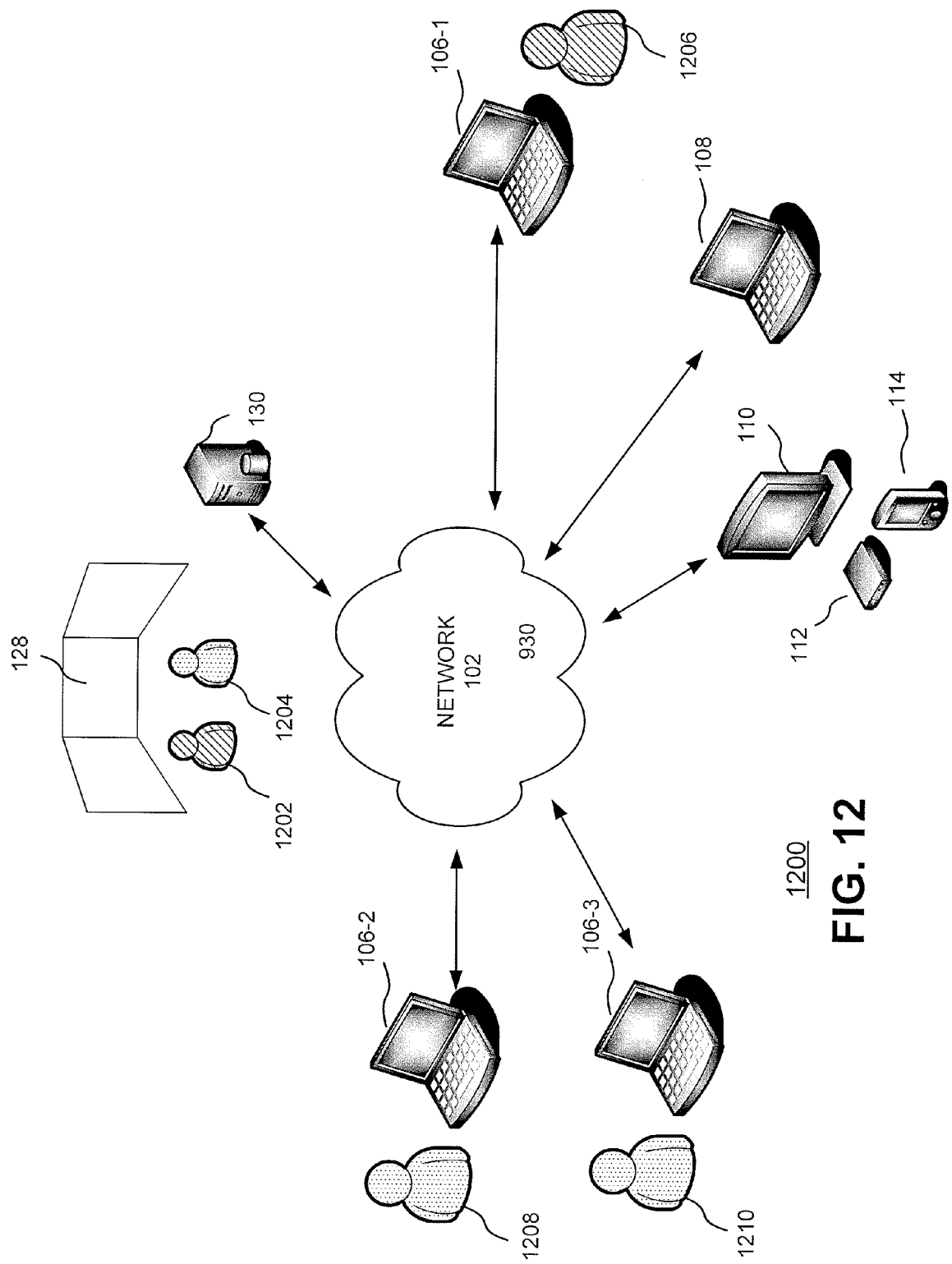
FIG. 12 is a block diagram of an exemplary environment for providing an exemplary interactive quiz show.

FIG. 12 is a block diagram of an environment 1200 for providing an exemplary interactive quiz show. Environment 1200 may correspond to the Economics Quiz Show on channel 53 as indicated in program table 400 and program guide 800. Environment 1200 may include network 102, studio 128, studio server 130, TV 110, STB 112, remote 114, and student computers 106-1 through 106-3. One or more of student computers 106-1 through 106-3 may be configured similarly to student computer 106 described above. In another embodiment, one or more of student computers 106-1 through 106-3 may be configured similarly to TV 110. In this latter embodiment, one or more of student computers 106-1 through 106-3 may include remote controls and set top boxes similar to remote 114 and STB 112. In this embodiment, quiz questions may be shown on the TV (similar to TV 110) or on the display of the remote control (similar to display 506 of remote 114) and answers may be received through the remote control.

The exemplary interactive quiz show of FIG. 12 may include five students, e.g., contestants: two students 1202 and 1204 physically present in studio 128 and three students 1206, 1208, and 1210 participating remotely from student computers 106-1, 106-2, and 106-3, respectively. Because one or more of students 1002 through 1010 may not be physically present in the same room or building (e.g., one or more may be participating from home), one or more of students 1202 through 1210 may be considered geographically separate or students 1202 through 1210 may be considered geographically diverse.

In one embodiment, students may be associated with different teams. For example, students 1202 and 1206 may attend the same school and may both be associated with a team for the school they both attend. As shown in FIG. 12, students 1202 and 1206 are striped. Contestants 1204, 1208, and 1210 may all attend the same school (but different than contestants 1202 and 1206) and may be associated with a team for the school they attend. As shown in FIG. 12, students 1204, 1208, and 1210 are dotted.

Figure 13:
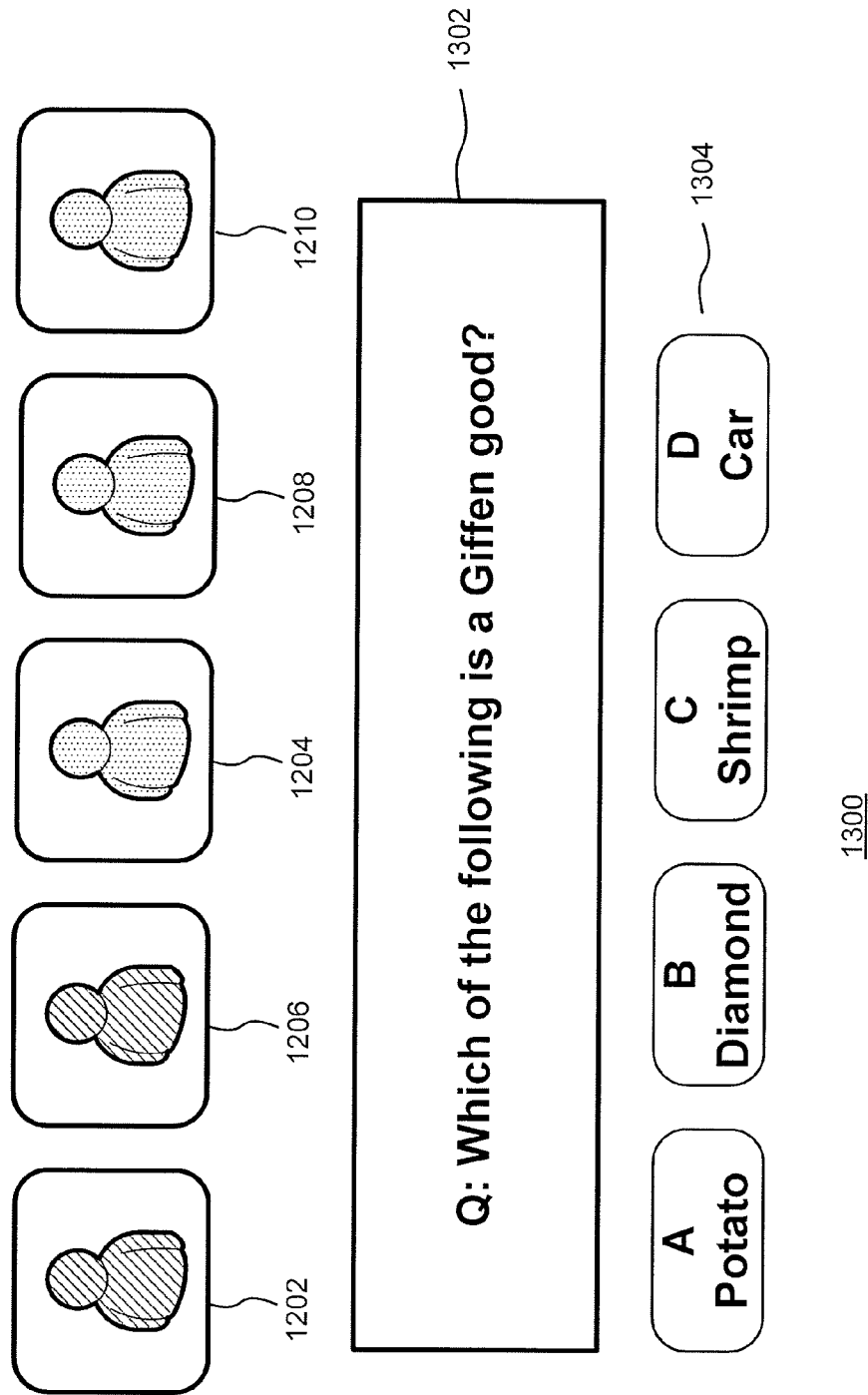
FIG. 13 is a block diagram of an exemplary display of a live, interactive learning program including a quiz show.

FIG. 13 is a block diagram of a GUI 1300 for displaying the exemplary interactive quiz show. GUI 1300 may be displayed, for example, when a user selects the Economics Quiz Show on channel 53 shown in programming guide 800. GUI 1300 may be shown on TV 110, for example, for viewing by parents, teachers, other students, or the public. GUI 1300 may also be shown on student computers 106-1 through 106-3, for example, for students 1202 through 1210 to interact with during the live quiz show. GUI 1300 may include pictures or live images of students 1202 through 1210. GUI 1300 may include a question 1302 and multiple choice answers 1304.

Figure 14:
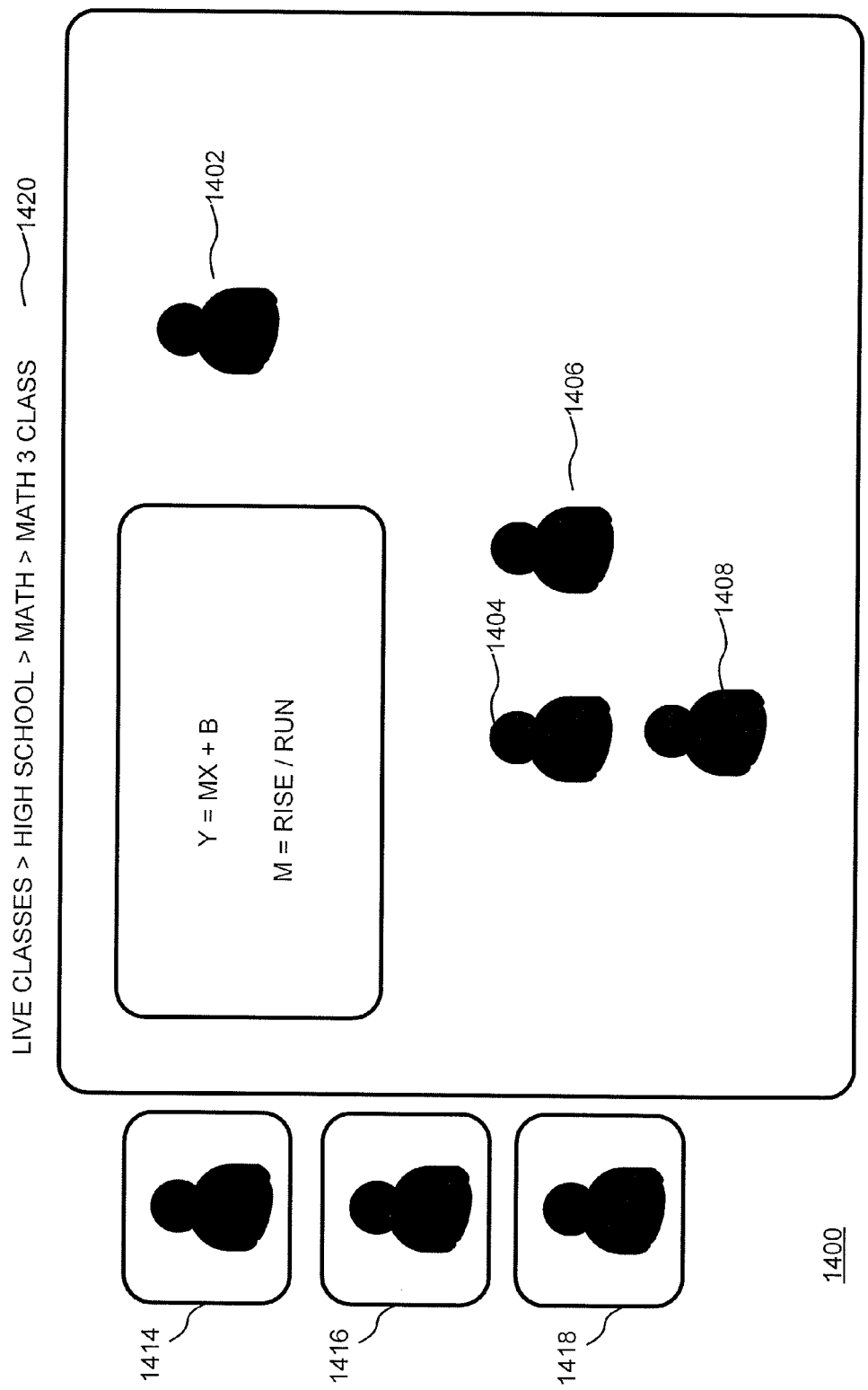
FIG. 14 is a block diagram of an exemplary display of a live, interactive learning program including a class.

FIG. 14 is a block diagram of an exemplary GUI 1400 associated with providing an interactive live class ("GUI 1400"). GUI 1400 may be displayed, for example, when a user selects the Math 3 Class on channel 5 shown in programming guide 800 or programming guide 700. Alternatively, GUI 1400 may be displayed, for example, when a user selects the Math 3 Class from presented as option 930 in GUI 900. GUI 1400 may include an icon, avatar, image, or live video representing a teacher 1402.

GUI 1400 may include icons, avatars, images, or live videos representing students 1404 through 1418. Student icons 1404 through 1408 may be present in the classroom. Student 1414 through 1418 may be attending the class remotely via network 102, for example. Teacher 1402 and students 1404, 1406, and 1408 may be able to interact with students 1414, 1416, and 1418 via network 102 (via streaming audio and video) even though they may not be physically present in the classroom. Likewise, students 1414, 1416, and 1418 may be able to interact with teacher 1402 and students 1404, 1406, and 1408 using network 102 (via streaming audio and video) even though they are not physically present in the classroom.

The GUI 1400 includes a title 1420 "LIVE CLASSES>HIGH SCHOOL>MATH>MATH 3 CLASS" that corresponds to the options selected in FIG. 9. As indicated by title 1420, display 1400 may include a live showing of a MATH 3 class, for example. Display 1400 may include a question area 1422 for students to type questions for interactive discussions.

Figure 15:
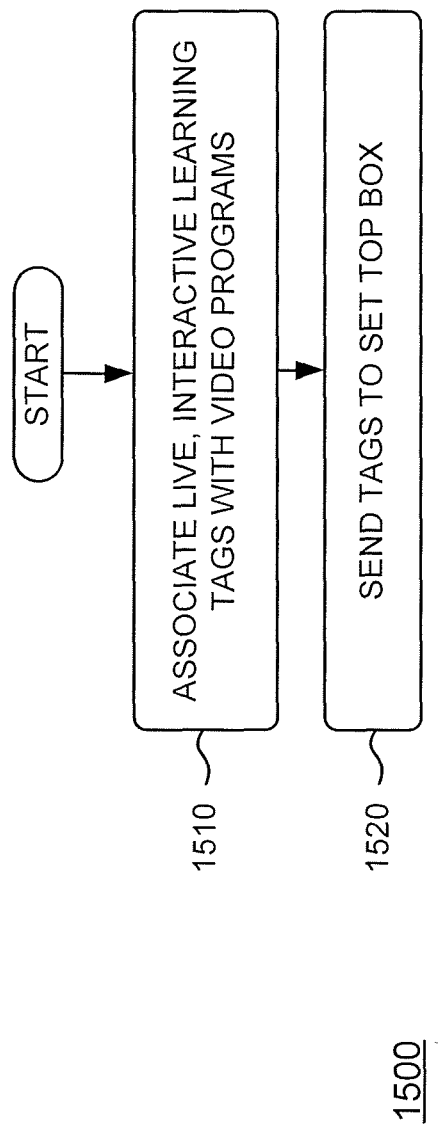
FIG. 15 is a flowchart of an exemplary process for associating tags with live, interactive learning programs.

FIG. 15 is a flowchart of an exemplary process 1500 for associating LIL tags with live, interactive learning programs. Process 1500 may include associating LIL tags with programs that offer live, interactive learning content (block 1510). In one embodiment, the association between tags and programs may be stored in program table 400. In another embodiment, the association between tags and programs may be stored in XML-based data files, as described above.

Tags may be sent to a set top box, such as STB 112 (block 1520). In one embodiment, the tags may be sent through an IP-based transfer protocol or via the same architecture used to send program guide data. In one embodiment, tags may be sent to TV 110. In another embodiment, the tags may be combined or concurrently transmitted with the program or the meta-data. It may be beneficial to integrate a tag with a program guide, a program information page, a program status bar, a program signal, and/or advertisement information prior to sending the tag to STB 112.

Figure 16:
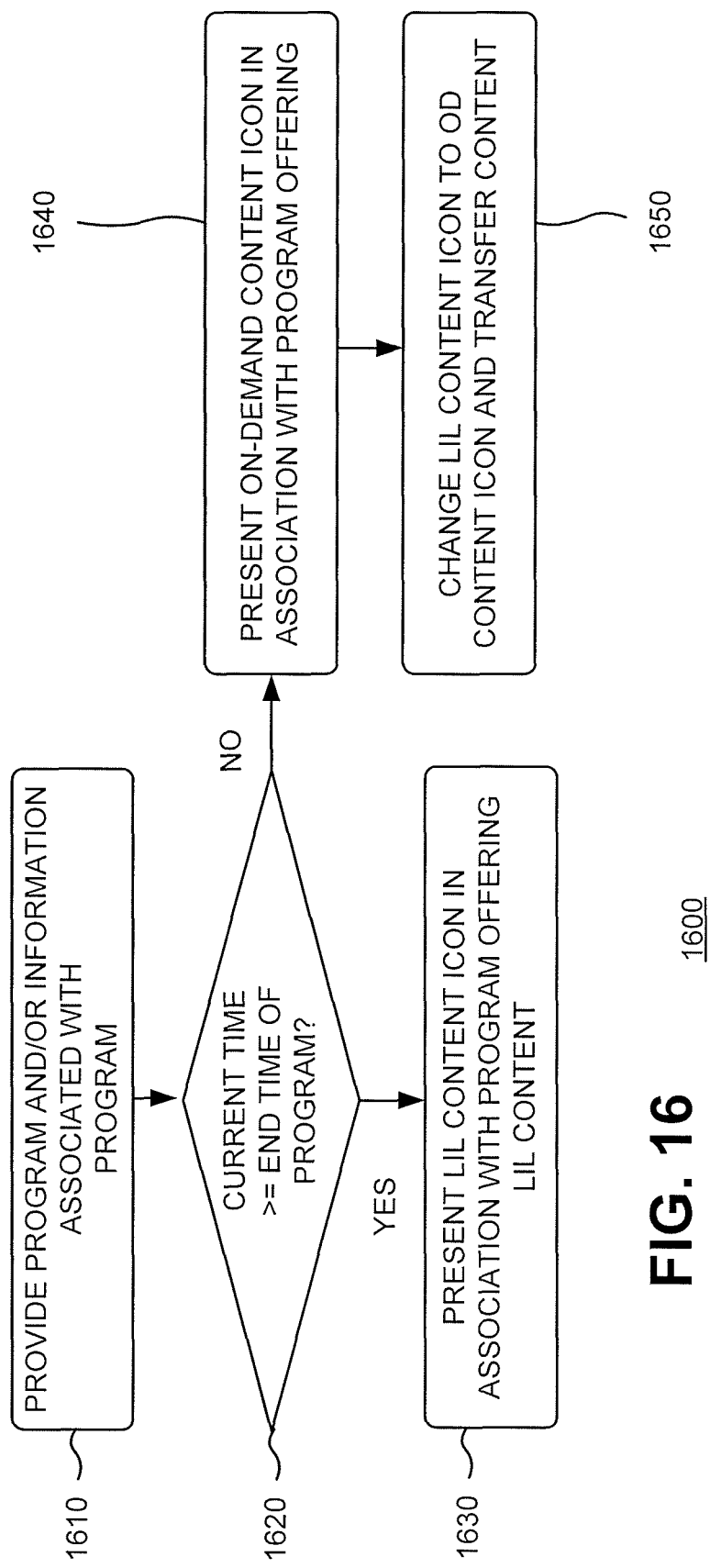
FIG. 16 is a flowchart of an exemplary process for providing interactive content.

FIG. 16 is a flowchart of an exemplary process 1600 for providing interactive content. In one embodiment, one or more of the process blocks of FIG. 16 may be performed by one or more software and/or hardware components within STB 112, for example.

The process may include providing a program or information associated with a program (block 1610). For example, if a user powers up STB 112 and/or TV 110 by, for example, pressing power button 610 or 502 on remote control 114, STB 112 may present program information or a program guide associated with a program (e.g., a dialog 1000) corresponding to a program. STB 112 may present a program information page, such as dialog 1000 or program guide 700, on TV 110. In other embodiments, other steps may be taken to cause a program or information associated with the program to be presented on TV 110.

If the current time is before the end of a program (block 1620: YES), then the program information may be presented with a LIL content icon. The LIL content icon may identify, to the user, that live, interactive learning content is available for the program. The LIL icon may be presented in a manner such that the user can quickly and easily identify (e.g., at a glance) that live, interactive learning content is available. In one embodiment, content may be filtered based on information in prerequisite field 406 and/or user field 302. In other words, in one embodiment, the user may only be presented with content he or she is qualified to view. If the current time is after the end of a live program (block 1620: NO), then the program may no longer live and interactive and the program information may be presented with an on-demand (OD) icon instead of a LIL icon (block 1640). If the current time is after the end of a live program (block 1620: NO), then the tag in program table 400 may also be changed from LIL to OD (e.g., on-demand content). If the current time is after the end of a live program (block 1620: NO), then the content may be moved, for example, from content database 1110 to on-demand content database 1140 (block 1650) and the corresponding meta-data may be moved from meta-data database 1115 to on-demand meta-data database 1143.

Figure 17:
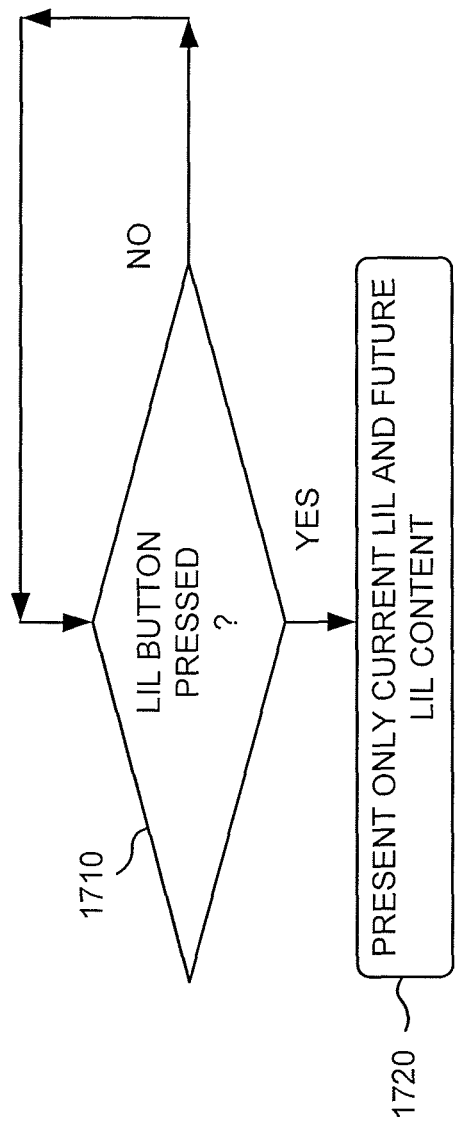
FIG. 17 is a flowchart of another exemplary process for providing interactive content.

FIG. 17 is a flowchart of an exemplary process 1700 for providing interactive content. It may be determined whether a LIL content button, such as button 750 in FIG. 7, has been pressed (block 1710). In another embodiment, remote control 114 may include a dedicated LIL content button (not shown). For example, the user, in response to seeing an LIL icon on TV 110, may press LIL content button 750 to obtain more information regarding live, interactive learning content. In one embodiment, no extra information regarding live, interactive learning content may be provided to the user until it is determined that the user has pressed LIL content button 750 (block 1710: NO).

If it is determined that the user has pressed interactive content button 460 (block 1710: YES), then additional information regarding LIL content may be presented (block 1720). In one embodiment, additional information may be presented in the form of programming guide 800 (FIG. 8). In one embodiment, LIL content may be filtered based on information in prerequisite field 406 and/or user field 302. In other words, in one embodiment, the user may only be presented with content he or she is qualified to view.

Embodiments described herein may provide a live, interactive learning program icon on a screen of a video display device. The interactive content icon may inform a user of the availability of live, interactive learning content in connection with a program.

Interactive learning may provide a better learning environment for students when compared to passive television viewing or other non-learning activities. In one or more embodiments described above, students may communicate and collaborate with their teachers, peers, and parents in a learning environment. One or more embodiments disclosed above may allow for students to participate in an interactive quiz show or a classroom. A high-speed, symmetric, fiber-optic network may provide for some or all of the structure to implement systems and methods described herein.

This patent application hereby incorporates herein by reference the following patent applications, filed on the same day as the present application: (1) INTERACTIVE LEARNING, Ser. No. 12/013,849; (2) INTERACTIVE LEARNING, Ser. No. 12/013,887; and (3) INTERACTIVE LEARNING, Ser. No. 12/013,793.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

While series of blocks have been described above, such as in FIGS. 15, 16, and 17, the order of the blocks may differ in other implementations. Moreover, non-dependent acts may be performed in parallel.

It will be apparent that aspects of the embodiments, as described above, may be implemented in many different forms of software, firmware, and hardware in the embodiments illustrated in the figures. The actual software code or specialized control hardware used to implement these embodiments is not limiting of the invention. Thus, the operation and behavior of the embodiments of the invention were described without reference to the specific software code—it being understood that software and control hardware may be designed to the embodiments based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
providing information associated with a live program for display on a video display device;
providing a live interactive content icon, for display on the video display device, when a current time is before an end time of the live program, the live interactive content icon indicating a capability of a user viewing the live program on the video display device to participate and interact remotely with other participants of the live program;

providing, when the current time is after the end time of the live program, information to the video display device to remove the display of the live interactive content icon and to display an on-demand content icon on the video display device, the on-demand content icon indicating that the live program was recorded and available on demand;

comparing prerequisite information with information indicative of the user, wherein the prerequisite information is associated with the live program and includes a required minimum achievement level in an academic class in which the user is a student; and based on the comparison, providing the live program for display on the video display device when an actual achievement level of the user in the academic class meets or exceeds the minimum achievement level and denying providing the live program for display on the video display device when the actual achievement level of the user does not meet the minimum achievement level.

2. The method of claim 1, further comprising:

receiving a selection, from the user, of the live program; and providing the live program or denying providing the program, based on the comparison, for display on the video display device.

3. The method of claim 1, wherein the prerequisite information includes a minimum grade average of the user in the academic class, the method further comprising:

comparing the minimum grade average with an actual grade average of the user in the class; and providing the live program for display on the video display device based on the comparison of the minimum grade average with the actual grade average.

4. The method of claim 1, where providing the live program or the information associated with the live program includes providing one of a program guide, a program information page, or a program status bar.

5. The method of claim 4, where providing the live interactive content icon includes providing the live interactive content icon on the program guide, the program information page, or the program status bar in connection with the live program.

6. The method of claim 1, where providing the live program or the information associated with the live program includes providing a program guide that presents a list of programs; and where the method further comprises filtering the list of programs based on whether live interactive content is available for the programs.

7. A system, comprising:

a database to store a list of programs, information indicating that one of the programs is associated with a capability of a user viewing the program on a video display device to participate and interact remotely with other participants of the program, an end time of the one of the programs, and prerequisite information associated with the one of the programs; and a processor, connected to the database, to:

determine a current time, and when the current time is after the end time of the one of the programs, removing the information from the database indicating that the one of the programs is associated with the capability of the user to participate and interact remotely and adding information to the database indicating that the one of the programs includes on-demand content, compare the prerequisite information with information indicative of the user, wherein the prerequisite information includes a required minimum achievement level in an academic class in which the user is a student, and provide the one of the programs for display to the user on the video display device when an actual achievement level of the user in the academic class meets or exceeds the minimum achievement level.

8. The system of claim 7, wherein the prerequisite information includes a minimum grade average in the academic class, and wherein the processor is further configured to:

compare the minimum grade average with an actual grade average of the user in the academic class; and provide the one of the programs for display to the user on the video display device based on the comparison of the minimum grade average with the actual grade average.

9. A non-transitory computer-readable medium including instructions executable by at least one processor, the computer readable medium comprising:

one or more instructions for providing information associated with a live program on a video display device; and one or more instructions for providing a live interactive content icon for display on the video display device when a current time is before an end time of the live program, the live interactive content icon indicating a capability of a user viewing the live program on the video display device to participate and interact remotely with other participants of the live program;

one or more instructions for providing, when the current time is after the end time of the live program, information to the video display device to remove the display of the live interactive content icon and to display an on-demand content icon on the video display device, the on-demand content icon indicating that the live program was recorded and available on demand;

one or more instructions for comparing prerequisite information with information indicative of the user, wherein the prerequisite information is associated with the live program and includes a required minimum achievement level in an academic class in which the user is a student; and one or more instructions for providing the live program for display on the video display device when the an actual achievement level of the user in the academic class meets or exceeds the minimum achievement level.

10. The non-transitory computer-readable medium of claim 9, further comprising:

one or more instructions for receiving a selection, from the user, of the live program; and one or more instructions for providing the live program to the video display device when the an actual achievement level of the user meets or exceeds the minimum achievement level and denying providing the live program for display on the video display device when the an actual achievement level of the user does not meet or exceed the minimum achievement level.

11. The non-transitory computer-readable medium of claim 9, wherein the prerequisite information includes a minimum grade average of the user in the academic class, the medium further comprising:

one or more instructions for comparing the minimum grade average with an actual grade average of the user in the academic class; and one or more instructions for providing the live program to the video display device based on the comparison of the minimum grade average with the actual grade average.

12. The non-transitory computer-readable medium of claim 9, further comprising one or more instructions for providing a program information page, or a program status bar.

13. The non-transitory computer-readable medium of claim 12, further comprising one or more instructions for providing the interactive content icon on the program guide, the program information page, or the program status bar in connection with the live program.

14. The non-transitory computer-readable medium of claim 9, further comprising:
- one or more instructions for providing a program guide that presents a list of programs; and
- one or more instructions for filtering the list of programs based on whether live interactive content is available for the list programs.

15. An apparatus comprising:
- means for providing information associated with a live program on a video display device; and
- means for providing a live interactive content icon for display on the video display device when a current time is before an end time of the live program, the live interactive content icon indicating a capability of a user viewing the live program on the video display device to participate and interact remotely with other participants of the live program;
- means for providing, when the current time is after the end time of the live program, information to the video display device to remove the display of the live interactive content icon and to display an on-demand content icon on the video display device, the on-demand content icon indicating that the live program was recorded and available on demand;
- means for comparing the prerequisite information with information indicative of the user, wherein the prerequisite information includes a required minimum achievement level in an academic class in which the user is a student; and
- means for providing the live program on the video display device when an actual achievement level of the user in the academic class meets or exceeds the minimum achievement level.

16. The apparatus of claim 15, further comprising:
- means for receiving a selection, from the user, of the live program; and
- means for providing the live program on the video display device when an actual achievement level of the student meets or exceeds the minimum achievement level and denying providing the live program for display on the video display device when the actual achievement level of the student does not meet or exceed the minimum achievement level.

17. The apparatus of claim 15, wherein the prerequisite information includes a minimum grade average of the user in the academic class, the apparatus further comprising:
- means for comparing the minimum grade average with an actual grade average of the in the academic class; and
- means for providing the live program on the video display device based on the comparison of the minimum grade average with the actual grade level.

18. The apparatus of claim 15, where when the current time is after the end time of the live program, the apparatus further comprising:
- means for removing information indicating the live interactive content icon from the information associated with the program and adding information indicating an on-demand icon to the information associated with the program.

* * * * *